US012217184B2

(12) United States Patent
Yoo et al.

(10) Patent No.: US 12,217,184 B2
(45) Date of Patent: Feb. 4, 2025

(54) LOW-POWER, HIGH-PERFORMANCE ARTIFICIAL NEURAL NETWORK TRAINING ACCELERATOR AND ACCELERATION METHOD

(71) Applicant: Korea Advanced Institute of Science and Technology, Daejeon (KR)

(72) Inventors: Hoi Jun Yoo, Daejeon (KR); Sang Yeob Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 868 days.

(21) Appl. No.: 17/317,900

(22) Filed: May 12, 2021

(65) Prior Publication Data

US 2022/0222533 A1 Jul. 14, 2022

(30) Foreign Application Priority Data

Jan. 11, 2021 (KR) .................... 10-2021-0003403

(51) Int. Cl.
| | |
|---|---|
| *G06N 3/082* | (2023.01) |
| *G06F 9/50* | (2006.01) |
| *G06F 15/80* | (2006.01) |
| *G06N 3/063* | (2023.01) |

(52) U.S. Cl.
CPC ........... *G06N 3/082* (2013.01); *G06F 9/5027* (2013.01); *G06F 15/80* (2013.01); *G06N 3/063* (2013.01)

(58) Field of Classification Search
CPC ....... G06N 3/082; G06F 9/5027; Y02D 10/00
See application file for complete search history.

(56) References Cited

U.S. PATENT DOCUMENTS

2019/0362235 A1* 11/2019 Xu .................. G06N 3/08

FOREIGN PATENT DOCUMENTS

| KR | 10-2018-0084289 A | 7/2018 |
| KR | 10-2019-0053262 A | 5/2019 |
| KR | 10-2019-0062225 A | 6/2019 |

OTHER PUBLICATIONS

Struharik, Rastislav JR, et al. "CoNNa—Hardware accelerator for compressed convolutional neural networks" (Year: 2020).*
Cao, Shijie, et al. "Efficient and effective sparse LSTM on FPGA with bank-balanced sparsity" (Year: 2019).*
(Continued)

*Primary Examiner* — Michael W Ayers
*Assistant Examiner* — Matiyas T Maru
(74) *Attorney, Agent, or Firm* — Revolution IP, PLLC

(57) ABSTRACT

A method of accelerating training of a low-power, high-performance artificial neural network (ANN) includes (a) performing fine-grained pruning and coarse-grained pruning to generate sparsity in weights by a pruning unit in a convolution core of a cluster in a lower-power, high-performance ANN trainer; (b) selecting and performing dual zero skipping according to input sparsity, output sparsity, and the sparsity of weights by the convolution core, and (c) restricting access to a weight memory during training by allowing a deep neural network (DNN) computation core and a weight pruning core to share weights retrieved from a memory by the convolution core.

7 Claims, 6 Drawing Sheets

(56) References Cited

OTHER PUBLICATIONS

Kim, et al., "PNPU: An energy-efficient deep-neural-network learning processor with stochastic coarse-fine level weight pruning and adaptive input/output/weight zero skipping.", (Year: 2020).*

Park, et al., "Faster cnns with direct sparse convolutions and guided pruning." (Year: 2016).*

Kim, et al., "A 146.52 TOPS/W deep-neural-network learning processor with stochastic coarse-fine pruning and adaptive input/output/weight skipping.", (Year: 2020).*

Jiaqi Zhang et al., "Eager Pruning: Algorithm and Architecture Support for Fast Training of Deep Neural Networks", Conference paper, Annual International Symposium on Computer Architecture, ISCA, Jun. 22, 2019, pp. 292-303.

Wenzhu Yang et al., "Thinning of convolutional neural network with mixed pruning", IET Image Process., 2019, vol. 13 Iss. 5, pp. 779-784.

Jingyang Zhu et al., "SparseNN: An Energy-Efficient Neural Network Accelerator Exploiting Input and Output Sparsity", Design, Automation And Test in Europe (Date 2018), pp. 241-244.

Office Action of Korean Patent Application No. 10-2021-0003403 mailed Sep. 29, 2022.

\* cited by examiner

[FIG.2]

FIG. 4
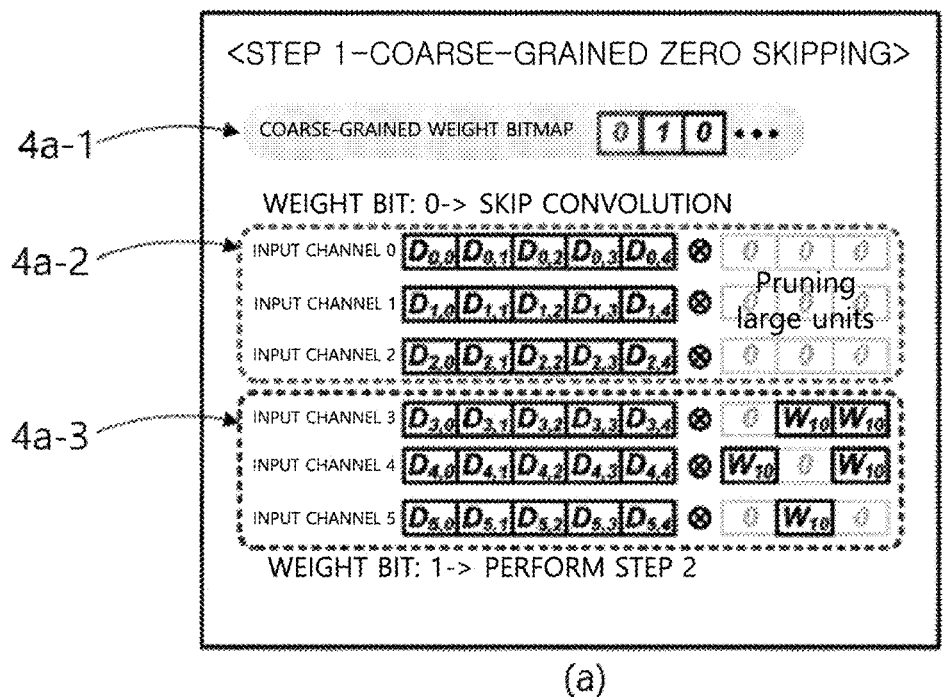
(a)
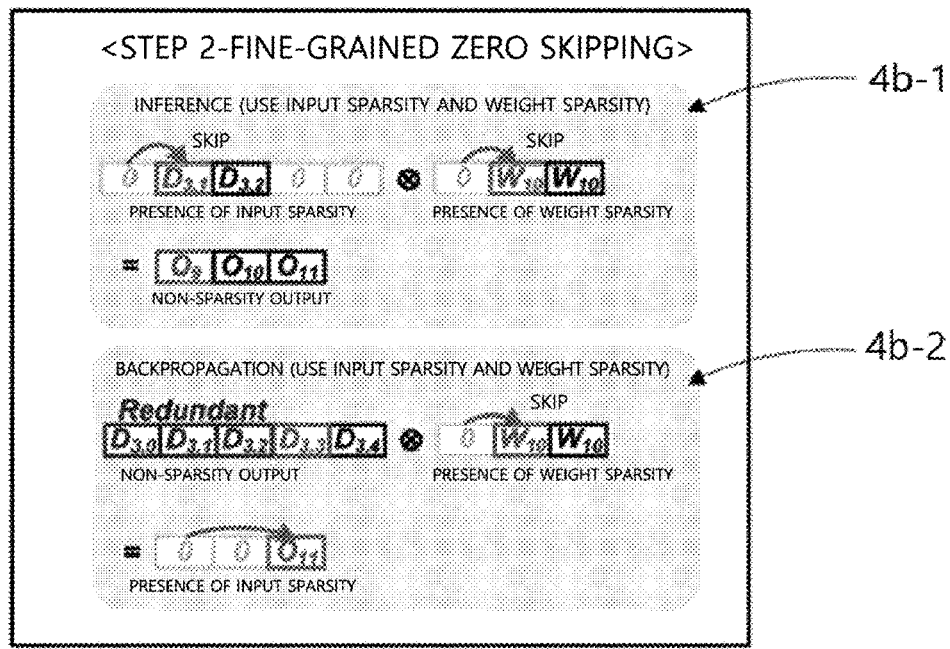
(b)

LOW-POWER, HIGH-PERFORMANCE ARTIFICIAL NEURAL NETWORK TRAINING ACCELERATOR AND ACCELERATION METHOD

BACKGROUND OF THE INVENTION

Field of the Invention

The present invention relates to a low-power, high-performance artificial neural network (ANN) training accelerator and an acceleration method, and more particularly, to a low-power, high-performance ANN training accelerator and an acceleration method, which increase a processing speed, reduce energy consumption for processing, and thus increase energy efficiency by converting computations of a neural network calculation unit into unnecessary computations and at the same time, skipping these unnecessary operations across a whole training process, and which increase a computation speed and energy efficiency by converting computations of a deep neural network (DNN) into unnecessary computations through pruning of weights used in the computations and skipping all unnecessary computations of different types in the respective steps of the training process.

Description of the Related Art

A deep neural network (DNN) overwhelmingly outperforms other algorithms in applications such as simple object recognition and motion recognition.

However, the DNN requires a very large number of computations and a very large amount of data for inference and learning, which makes an energy-efficient operation difficult on a device in a mobile environment.

In a DNN operation, convolution is repeated between two operands. Learning includes three steps: inference, error backpropagation, and weight update. In each step, two different operands are used.

To accelerate the convolution process with high energy efficiency during training of the DNN, a method of using the sparsity of input data has been proposed as a prior art.

However, although this prior art may accelerate convolution with increased energy efficiency in the first of the three steps of training the DNN, that is, in the inference step, it is not viable or only partially available in the remaining two steps, error backpropagation and weight update.

Therefore, an operator capable of accelerating the DNN by relying only on the sparsity of input data has limitations in training the DNN with energy efficiency.

Further, a method of using the sparsity of weight data has been proposed as a prior art in order to accelerate convolution in the inference step of the DNN.

To generate weight sparsity while maintaining high accuracy during training, iterative training and weight pruning are needed. For this purpose, a weight pruning unit is required separately.

However, because a weight pruning unit is not separately integrated in the prior art, it is not possible to generate weight sparsity during training, and thus the prior art is not suitable for ANN training.

SUMMARY OF THE INVENTION

Therefore, the present invention has been made in view of the above problems, and it is an object of the present invention to provide a low-power, high-performance artificial neural network (ANN) training accelerator which maximizes use of sparsity by generating sparsity in weight data in a deep neural network (DNN) calculation unit during training, and includes a weight pruning algorithm and a weight pruning unit structure which are optimized not to decrease the efficiency of the calculation unit.

It is another object of the present invention to provide a low-power, high-performance ANN training accelerator including a neural network calculation unit structure which accelerates computations with high energy efficiency by selecting different data in each step of a learning process including three steps according to the sparsity pattern of each data, which varies in each step, and maximizing use of the sparsity of the selected data.

In accordance with an aspect of the present invention, the above and other objects can be accomplished by the provision of a method of accelerating training of a low-power, high-performance artificial neural network (ANN). The method includes (a) performing fine-grained pruning and coarse-grained pruning to generate sparsity in weights by a pruning unit in a convolution core of a cluster in a lower-power, high-performance ANN trainer, (b) selecting and performing dual zero skipping according to input sparsity, output sparsity, and the sparsity of weights by the convolution core, and (c) restricting access to a weight memory during training by allowing a deep neural network (DNN) computation core and a weight pruning core to share weights retrieved from a memory by the convolution core.

In the step of (a), the pruning unit may maximize the generated sparsity with the same accuracy by periodically applying the coarse-grained pruning and the fine-grained pruning to a model requiring training during the training, instead of applying the coarse-grained pruning and the fine-grained pruning once to a pre-trained model.

The pruning unit may determine a periodicity of the coarse-grained pruning and the fine-grained pruning by recording a maximum accuracy achieved during training until before pruning and when a higher accuracy than the maximum accuracy score is achieved by training again after the pruning, performing next pruning.

The pruning unit may control a threshold set for pruning in each period to decrease an additionally generated sparsity ratio for an input channel with high weight sparsity generated by the coarse-grained pruning and the fine-grained pruning and increase the additionally generated sparsity ratio for an input channel with low weight sparsity generated by the coarse-grained pruning and the fine-grained pruning.

The pruning unit may perform pruning by coarse-grained similarity comparison, coarse-grained magnitude comparison, or fine-grained magnitude comparison. The pruning unit may perform the pruning, while changing the threshold by a specific fixed value in each period, until no further accuracy recovery is possible by the training after the pruning.

In the step of (b), the convolution core may receive a sparsity pattern for two of inputs, outputs, and weights, and perform zero skipping convolution.

The convolution core may perform zero skipping convolution by using the sparsity of weights, the convolution core skips zeroes in weight data by skipping computations using consecutive zeros caused by coarse grains at once and skipping computations using random zeros caused by fine grains, one each time.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a diagram illustrating a hierarchical zero skipping operation using the sparsity of weights to which probabilistic coarse-grained to fine-grained pruning is applied in the low-power, high-performance ANN training accelerator according to the present invention;

DETAILED DESCRIPTION OF THE INVENTION

Figure 1:
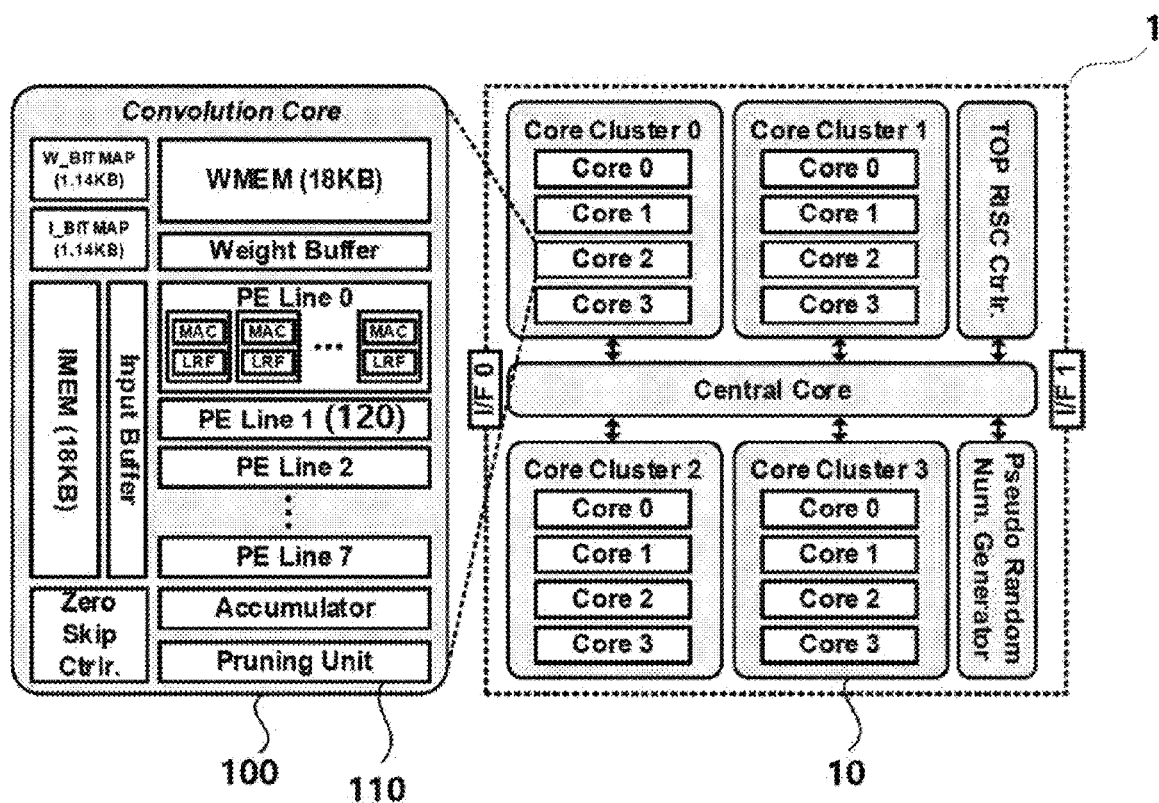
FIG. 1 is a block diagram illustrating a low-power, high-performance artificial neural network (ANN) training accelerator according to the present invention.

The terms or words used in the specification and claims should not be interpreted restrictively as their usual or dictionary meanings. Rather, they should be interpreted as meanings and concepts consistent with the technical idea of the present invention based on the principle that the inventor may appropriately define the concepts of terms to describe his or her own invention in the best way.

Therefore, the embodiments described in the specification and the configurations shown in the drawings are only the most preferred embodiments of the present invention, not representing all the technical spirit of the present invention. Accordingly, it is to be understood that there may be various equivalents and variations to substitute for the embodiments.

The present invention will be described in detail with reference to the accompanying drawings, so that those skilled in the art may implement the present invention easily.

FIG. 1 is a diagram illustrating the overall configuration of a low-power, high-performance artificial neural network (ANN) training accelerator according to the present invention.

Referring to FIG. 1, a low-power, high-performance ANN training accelerator 1 according to the present invention includes four clusters 10 each including four convolution cores 100.

Particularly, each convolution core 100 includes a pruning unit 110 and a plurality of processing element (PE) arrays 120.

Figure 2:
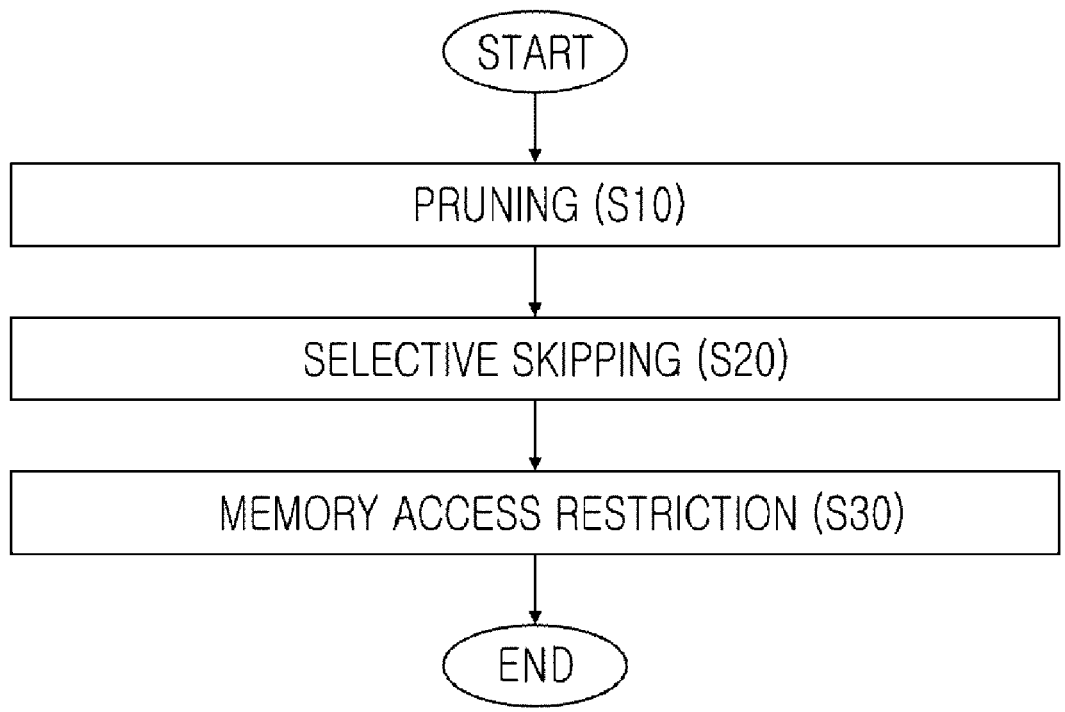
FIG. 2 is a flowchart illustrating an acceleration method of the low-power, high-performance ANN training accelerator according to the present invention.

With reference to FIG. 2, an acceleration method of the low-power, high-performance ANN training accelerator having the above configuration according to the present invention will be described below.

The pruning unit 110 of a convolution core 100 in a cluster 10 of the low-power, high-performance ANN training accelerator 1 performs fine-grained pruning and coarse-grained pruning to generate sparsity in weights (S10).

The pruning unit 110 performs fine-grained pruning and coarse-grained pruning to generate sparsity in weights.

More specifically, the pruning unit 110 performs fine-grained pruning to generate a random sparsity pattern by replacing values with small magnitudes with zeros.

Further, the pruning unit 110 calculates similarities between weights or the magnitudes of the weights on an output channel basis, and performs coarse-grained pruning to replace similar consecutive weights or consecutive weights with small magnitudes with consecutive zeros.

Figure 3:
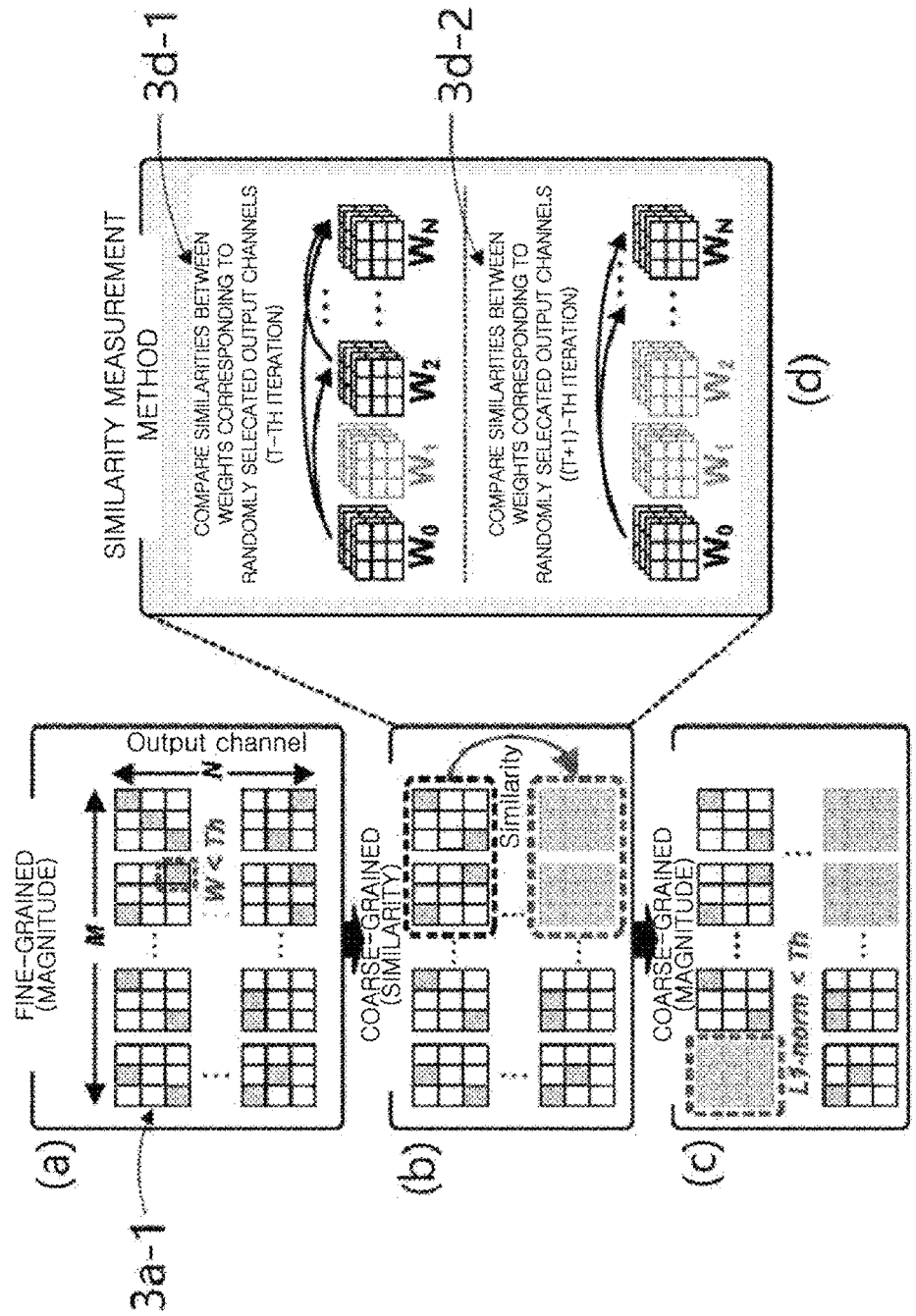
FIG. 3 is a diagram illustrating probabilistic coarse-grained to fine-grained pruning in the low-power, high-performance ANN training accelerator according to the present invention.

Because the fine-grained pruning facilitates generation of high sparsity and the coarse-grained pruning facilitates simple processing in hardware and thus is energy-efficient, the present invention performs both coarse-grained pruning and fine-grained pruning, taking the advantages of both, as illustrated in FIG. 3.

As illustrated in FIG. 3(a), the pruning unit 110 first generates many zeros by performing fine-grained pruning in which the value of each weight is compared with a specific threshold. Therefore, similarities between different weights are increased, thus decreasing the magnitudes of weights, as illustrated in FIG. 3a-1.

The pruning unit 110 then performs similarity-based coarse-grained pruning as illustrated in FIG. 3(b) and magnitude-based coarse-grained pruning as illustrated in FIG. 3(c). The sequential use of fine-grained pruning and coarse-grained pruning leads to generation of more zeros than application of only coarse-grained pruning.

When the pruning unit 110 still performs conventional coarse-grained pruning, the pruning unit 110 selects an output channel to be pruned based on similarity and magnitude comparison between all output channels, and replaces all components of weights corresponding to the output channel with zeros.

However, this method significantly decreases accuracy, which makes it difficult to generate a large number of consecutive zeros.

Compared to the conventional coarse-grained pruning in which the values of all input channels of weights used for computation of one output channel are changed to zeros at once, the pruning unit 110 of the present invention performs new block-wise pruning in which one weight is divided into pruning blocks in the direction of input channels, and only blocks having the same index in different output channels are subjected to similarity and magnitude comparison.

There is a trade-off in which as the size of a block decreases, the length of consecutive zeros decreases and sparsity increases. In the present invention, the size of a block is set to a quarter of each input channel to increase a sparsity ratio and the length of consecutive zeros.

The pruning unit 110 performs similarity comparison and magnitude comparison in a finer manner than in the conventional coarse-grained pruning, thus increasing coarse-grained sparsity by 1.26 times, compared to coarse-grained pruning only. As a consequence, when ImageNet is trained by AlexNet, sparsity of 78.2% (fine-grained sparsity of 22.4% and coarse-grained sparsity of 55%) is achieved for an accuracy decrease of 5% or below.

Because it is necessary to compare the similarities of all output channels for coarse-grained pruning in order to perform a pruning operation, the amount of computation is proportional to the square of the number of output channels, and thus a very large amount of computation is required. When ImageNet is trained using AlexNet, the pruning unit 110 requires a computational amount equivalent to 5.4 times of a DNN operation (1 iteration, 1 batch).

Accordingly, the pruning unit 110 performs probabilistic coarse-grained to fine-grained pruning in order to reduce the computational overhead required for similarity calculation, as illustrated in FIG. 3(*d*).

That is, compared to the conventional method of comparing all the similarities of N output channels once, the pruning unit 110 performs a process of generating N/T groups by randomly sampling T output channels at each iteration, as illustrated in FIG. 3*d*-1.

The pruning unit 110 compares similarities only within each group, and performs a process of comparing similarities within a new group through new random sampling at the next iteration, as illustrated in FIG. 3*d*-2.

The present invention reduces the number of samples for similarity comparison by the above-described process, thereby decreasing the amount of computation by 99.7%. Further, the present invention achieves the same effect as comparing the similarities of all output channels by repeatedly performing probabilistic grouping and pruning at each iteration.

The periodicity of probabilistic coarse-grained to fine-grained pruning is determined based on accuracy. Specifically, the pruning unit 110 records a maximum accuracy achieved during training until before pruning is performed, performs training again after the pruning, and then performs the next pruning when an accuracy higher than the previous maximum accuracy is achieved.

Further, the pruning unit 110 of the present invention performs the probabilistic coarse-grained to fine-grained pruning by changing thresholds for three pruning schemes ("coarse-grained similarity comparison", "coarse-grained magnitude comparison", and "fine-grained magnitude comparison") by a specific fixed value in each pruning period, until accuracy recovery is no longer possible by training after pruning.

Further, because all the input channels have different weight zero ratios when a convolutional operator performs computations for multiple input channels in parallel, the amount of computation to be processed is different in each computation, thus decreasing the utilization of the operator.

To avert the problem, the sparsity ratio of each input channel is obtained before pruning, and a threshold used for the weight of each input channel is adjusted according to the sparsity ratio in the pruning step.

Specifically, for an input channel with high sparsity, a threshold set for pruning is adjusted in each period so that a sparsity ratio additionally generated by pruning decreases (a threshold for coarse-grained similarity comparison increases, a threshold for coarse-grained magnitude comparison decreases, and a threshold for fine-grained magnitude comparison decreases). For an input channel with low sparsity, a threshold set for pruning is adjusted in each period so that a sparsity ratio additionally generated by pruning increases (the threshold for coarse-grained similarity comparison decreases, the threshold for coarse-grained magnitude comparison increases, and the threshold for fine-grained magnitude comparison increases).

As a consequence, for the same accuracy, the coarse-grained sparsity decreases only by 1.5%, and the fine-grained sparsity decreases only by 0.2%.

Conventionally, a pipeline between a convolution core and a pruning core requires a very large amount of computation for pruning, and thus the overall processing speed is reduced by a stall phenomenon that lengthens the processing time of the pruning core. In contrast, the probabilistic coarse-grained to fine-grained pruning reduces the processing time of the pruning core, and thus increases the throughput of the entire pipeline by 1.9 times.

Subsequently, the convolution core selects and performs dual zero skipping according to the input sparsity, the output sparsity, and the weight sparsity (S20).

More specifically, selective input/output/weight computation skipping is performed by selecting more dual zero skipping according to the input/output/weight sparsity of the three steps of DNN learning. For zero skipping convolution, a weight bitmap is composed of two layers: coarse-grained bitmap and fine-grained bitmap.

Zero skipping (omitting) convolution in two steps is illustrated in FIG. 4, and as illustrated in FIG. 4(*a*), coarse-grained zero skipping (omitting) is first performed.

When a bit in a coarse-grained weight bitmap is 0 as illustrated in FIG. 4*a*-1, it means that weights multiplied by various inputs are consecutive zeroes over a specific number of channels, and as illustrated in FIG. 4*a*-2, a process of skipping all of the operations at once is performed.

When a bit in the coarse-grained weight bitmap is 1 as illustrated in FIG. 4*a*-1, a convolution operation for multiplying weights by multiple inputs is performed as illustrated in FIG. 4*a*-3. That is, fine-grained zero skipping convolution corresponding to step 2 is performed as illustrated in FIG. 4(*b*).

Regarding inference in FIG. 4(*b*), since information about sparsity in outputs is not known until computations are completed, zero skipping convolution is performed for the inputs and the weights, as illustrated in FIG. 4*b*-1. In error backpropagation, although there is no sparsity in errors, zero skipping convolution is performed for the outputs and the weights by using an output bitmap generated by the sparsity pattern of the inputs obtained during inference, as illustrated in FIG. 4*b*-2.

When weight gradients are generated, an output (bitmap) is generated using a weight bitmap to perform zero skipping convolution for the outputs and the input used for the inference.

Figure 5:
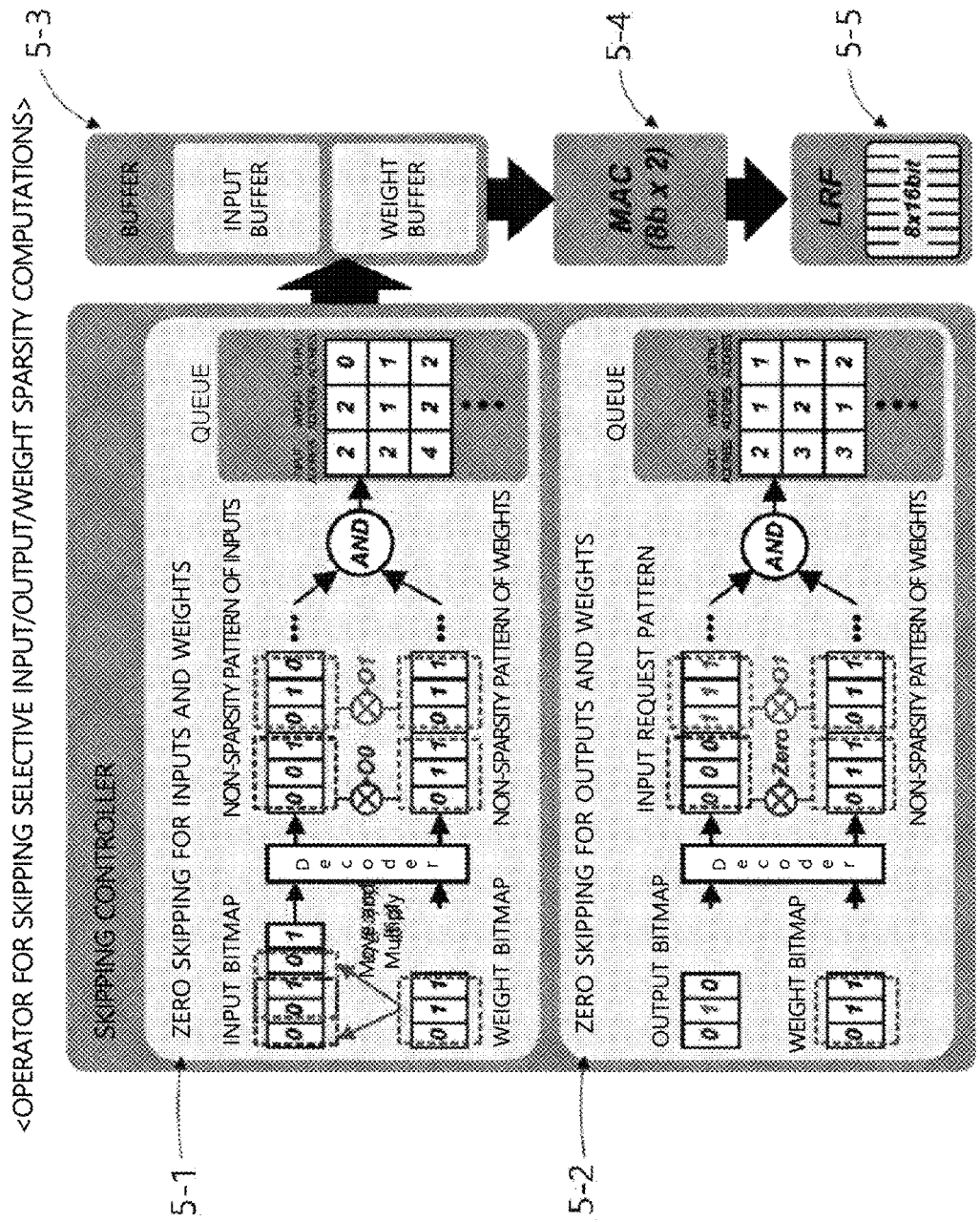
FIG. 5 is a diagram illustrating an exemplary architecture of an operator for supporting an operation of selecting two data with high sparsity from among inputs, outputs, and weights and skipping zeros present in the two data in the low-power high-performance ANN training accelerator according to the present invention.

As illustrated in FIG. 5, a specific structure of an operator 300 for selectively skipping input/output/weight computations includes a zero skipping controller, a floating-point multiplier and accumulator (floating-point MAC supporting FP8 and FP16), and a register file (8×16b local register file (LRF)).

In FIG. 5, the zero skipping controller receives a different type of bitmap in each mode, and generates a non-zero flag according to a convolution order.

As illustrated in FIG. 5-1, in an operation of skipping zeros in inputs and weights, an input bitmap and a weight bitmap are received as inputs. When convolution is actually performed, non-sparsity information about inputs and non-sparsity information about weights required to generate each output are generated. Then, cases in which non-zero input and non-zero output pairs used in convolution for generation of a specific output are obtained by AND-operating the two pieces of information.

Non-zero input and non-zero weight pairs are obtained. Addresses at which the inputs are stored, addresses at which the weights are stored, and addresses at which partial sums to be added to the products between the inputs and the weights are stored are generated and stored in a queue buffer.

As illustrated in FIG. 5-2, in an operation of skipping zeros in outputs and weights, an output bitmap and a weight bitmap are received as inputs. When convolution is actually performed, an input pattern and non-sparsity information about weights required to generate non-zero outputs are generated. Then, cases in which an input and output pair is required for convolution for generation of a specific output are obtained by AND-operating the two pieces of information.

Cases in which an output and weight pair is required are obtained. Addresses at which the inputs are stored, addresses at which the weights are stored, and addresses at which partial sums to be added to the products between the inputs and the weights are stored are generated and stored in the queue buffer.

Once the queue buffer is generated, inputs and weights are retrieved by sequentially obtaining addresses and accessing an input buffer and a weight buffer in the buffer illustrated in FIG. 5-3 according to the addresses.

As illustrated in FIG. 5-4, the floating-point MAC operator for multiplication and accumulation multiplies the inputs and weights from the buffer. As illustrated in FIG. 5-5, partial sums are retrieved from the register file called LRF by accessing the register file using output addresses from the queue buffer, and accumulated with the multiplication results. The computation results are stored in the LRF again.

In this manner, dual zero skipping may be used in all three steps of learning.

Finally, a step of restricting access to the weight memory during the training is performed by allowing a DNN computation core and a weight pruning core to share the weights retrieved from the memory by the convolution core (S30).

Figure 6:
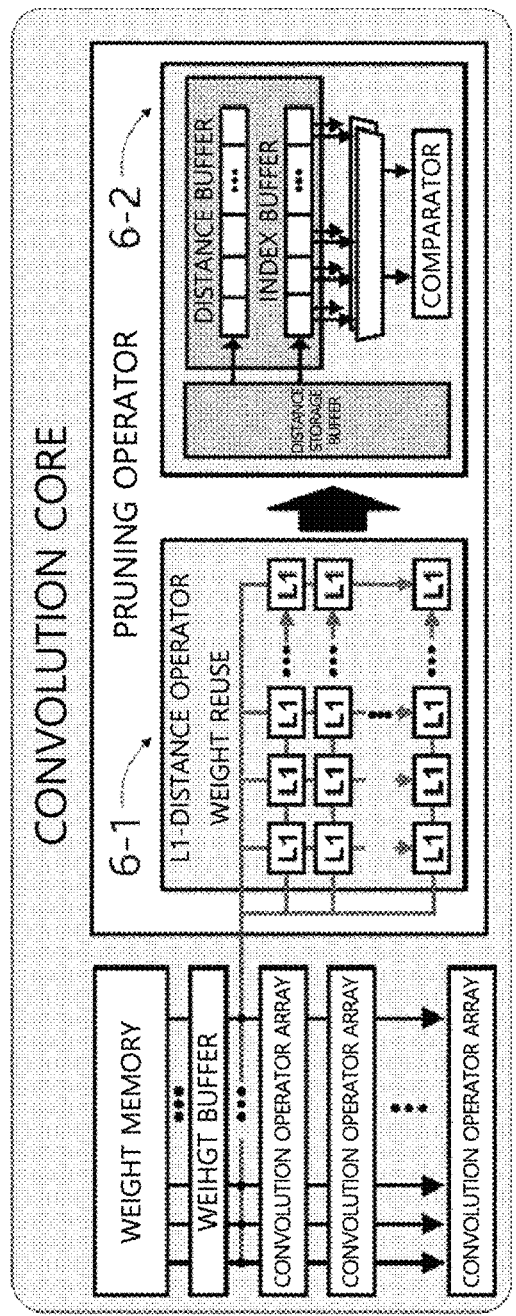
FIG. 6 is a diagram illustrating an exemplary architecture of a deep neural network (DNN) computation core in the low-power, high-performance ANN training accelerator according to the present invention.

More specifically, the pruning core illustrated in FIG. 6 is designed to block access to an additional weight memory generated for pruning. In the present invention, the weight memory provides weight data corresponding to different output channels simultaneously to the convolution core and the pruning core during inference.

As illustrated in FIG. 6-1, an L1-distance calculator of the weight pruning core calculates similarities and magnitudes of output channels by using received data. As illustrated in FIG. 6-2, the calculated similarity comparison values are stored in a distance storage buffer of a distance comparator, and values stored in the buffer are retrieved and clustered to detect similar weights. In addition, when the weights are updated during generation of weight gradients, fine-grained sparsity is generated by determining whether the weights are less than a threshold, thus reducing additional memory accesses. In this manner, the number of weight memory accesses required for DNN learning is decreased by 33.3%.

As is apparent from the above description, the present invention provides a low-power, high-performance ANN training accelerator generates weight sparsity and selects high-sparsity data to be used in each learning step at the same time, thereby skipping unnecessary computations and hence accelerating convolution.

When ImageNet is trained by AlexNet, the low-power, higher-performance ANN training accelerator according to the present invention generates weight sparsity close to 80% by the proposed pruning method. Furthermore, since input/output sparsity of 60 to 70% is used in each step of learning, a computation amount decrease of about 87% may be achieved for an accuracy decrease of 5% or below.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of accelerating training of a low-power, high-performance artificial neural network (ANN), the method comprising:

(a) performing fine-grained pruning and coarse-grained pruning to generate sparsity in weights by a pruning unit in a convolution core of a cluster in a lower-power, high-performance ANN trainer, wherein
the fine-grained pruning generates a random sparsity pattern by replacing values with small magnitudes with zeros, and
the coarse-grained pruning calculates similarities between weights or magnitudes of the weights on an output channel basis and replaces similar consecutive weights or consecutive weights with the small magnitudes with consecutive zeros;

(b) selecting and performing dual zero skipping according to input sparsity, output sparsity, and the sparsity of weights by the convolution core,
wherein, when the convolution core performs the dual zero skipping by using the sparsity of weights, the convolution core skips zeroes in weight data by
skipping computations using the consecutive zeros caused by the coarse-grained pruning at once, and
skipping computations using random zeroes caused by the fine-grained pruning one at a time; and (c) restricting access to a weight memory during training by allowing a deep neural network (DNN) computation core and a weight pruning core to share weights retrieved from a memory by the convolution core.

2. The method according to claim 1, wherein in the step of (a), the pruning unit maximizes the generated sparsity with the same accuracy by periodically applying the coarse-grained pruning and the fine-grained pruning to a model requiring training during the training, instead of applying the coarse-grained pruning and the fine-grained pruning once to a pre-trained model.

3. The method according to claim 2, wherein the pruning unit determines a periodicity of the coarse-grained pruning and the fine-grained pruning by recording a maximum accuracy achieved during training until before pruning and when a higher accuracy than the maximum accuracy score is achieved by training again after the pruning, performing next pruning.

4. The method according to claim 3, wherein the pruning unit controls a threshold set for pruning in each period to decrease an additionally generated sparsity ratio for an input channel with high weight sparsity generated by the coarse-grained pruning and the fine-grained pruning and increase the additionally generated sparsity ratio for an input channel with low weight sparsity generated by the coarse-grained pruning and the fine-grained pruning.

5. The method according to claim 4, wherein the pruning unit performs pruning by coarse-grained similarity comparison, coarse-grained magnitude comparison, or fine-grained magnitude comparison, and
wherein the pruning unit performs the pruning, while changing the threshold by a specific fixed value in each period, until no further accuracy recovery is possible by the training after the pruning.

6. The method according to claim 1, wherein in the step of (b), the convolution core receives a sparsity pattern for two of inputs, outputs, and weights, and performs zero skipping convolution.

7. A low-power, high-performance artificial neural network (ANN) training accelerator comprising:
a plurality of clusters, each including a plurality of convolution cores,
wherein a pruning unit in each of the convolution cores performs fine-grained pruning and coarse-grained pruning to generate sparsity in weights, and the convolution core selects and performs dual zero skipping according to input sparsity, output sparsity, and the sparsity of weights and restricts access to a weight memory during training by allowing a deep neural network (DNN) computation core and a weight pruning core to share weights retrieved from a memory, and wherein the pruning unit performs the fine-grained pruning for generating a random sparsity pattern by replacing values with small magnitude with zeros, and performs the coarse-grained pruning by calculating similarities or magnitudes of weights on an output channel basis, and replacing consecutive similar weights or consecutive weights with small magnitudes with consecutive zeros, wherein, when each convolution core performs zero skipping convolution, the convolution core skips zeroes in weight data by skipping computations using random zeroes caused by the fine-grained pruning one at a time, and skipping computations using the consecutive zeros caused by the coarse-grained pruning at once.

\* \* \* \* \*